Sept. 26, 1933.  E. N. FOX  1,928,448
LUBRICATING DEVICE
Filed Sept. 12, 1931
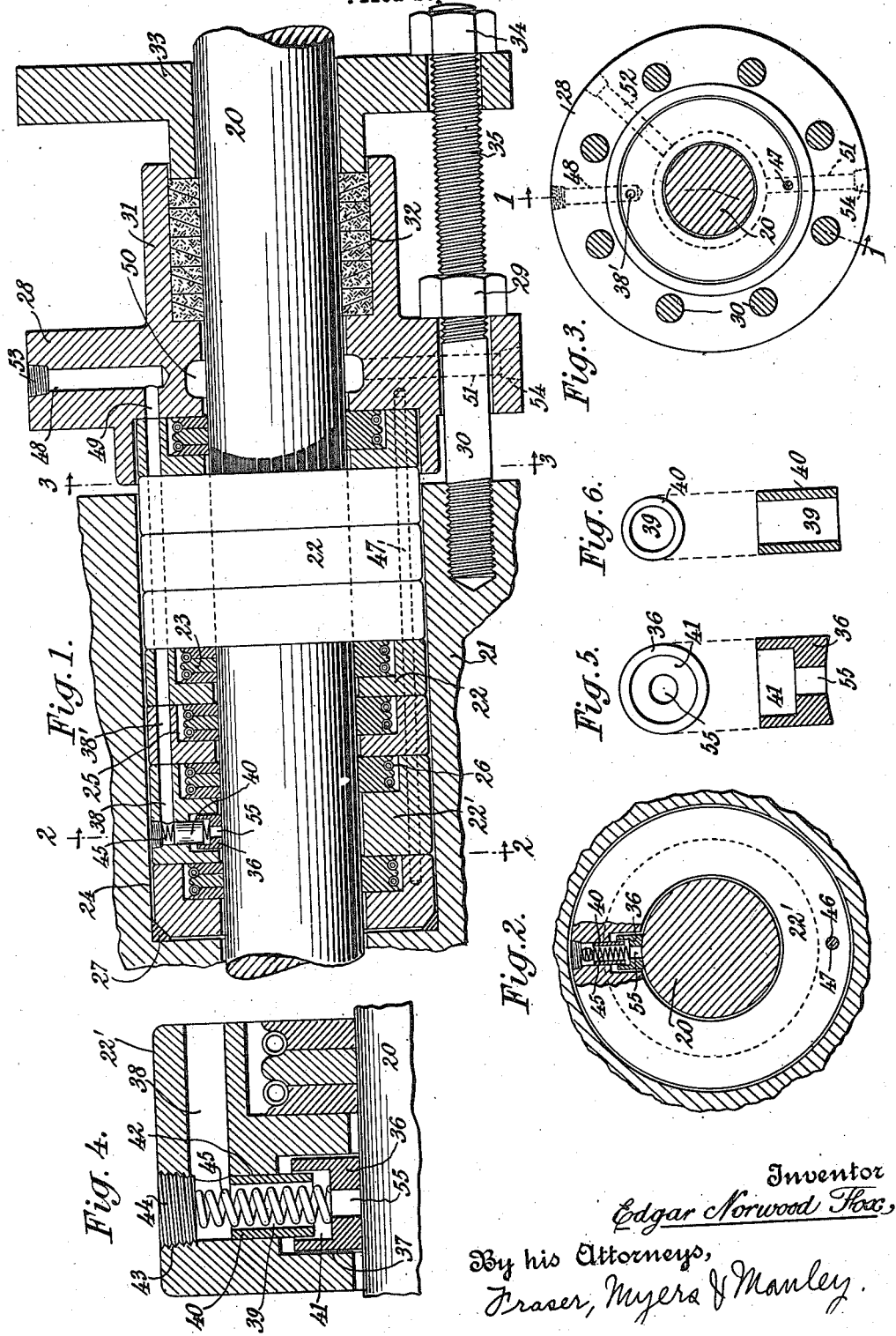
Inventor
Edgar Norwood Fox,
By his Attorneys,
Fraser, Myers & Manley.

Patented Sept. 26, 1933

1,928,448

UNITED STATES PATENT OFFICE 1,928,448

LUBRICATING DEVICE

Edgar Norwood Fox, Palmyra, N. Y., assignor to The Garlock Packing Company, Palmyra, N. Y., a corporation of New York Application September 12, 1931
Serial No. 562,501

4 Claims. (Cl. 184—24)

This invention relates to an improved rod lubricating device, and is peculiarly adapted for use in association with the fluid-sealing packing of a reciprocating piston rod.

It is an object of the invention to provide a lubricating device which will insure the application of the lubricant to the surface of the rod at a predetermined point from which it can be best spread or distributed to other parts of the surface, and to accomplish this purpose without in any manner interfering with slight, free, lateral movements of the rod in any direction.

It is a further object of the invention to provide a lubricating element of the above-described character which may be installed in any desired location in a stuffing-box and means whereby the lubricating material may be readily fed to the lubricator from any convenient point without the stuffing-box and satisfactorily drained from the stuffing-box as it gravitates to a level below the piston rod.

In the accompanying drawing illustrating the preferred form of the invention:—

Figure 1 is a longitudinal view of a piston rod and associated stuffing-box, packing, etc., with lubricating means embodying the above-described invention applied, parts of the device being illustrated in section and parts in side elevation.

Fig. 2 is a transverse sectional view of the device illustrated in Fig. 1, the section being taken along the line 2—2 and viewed as indicated by the arrows.

Fig. 3 is a transverse sectional view drawn to a smaller scale, the section being taken along the line 3—3 of Fig. 1 and viewed in the direction indicated by the arrows.

Fig. 4 is a fragmentary sectional view of a portion of the device illustrated in Fig. 1 drawn to a larger scale.

Fig. 5 is a top view and transverse sectional view of the wiper by which the lubricant is applied to the surface of the rod.

Fig. 6 is an end view and longitudinal sectional view of the sleeve through which the lubricant is fed to the wiper.

Although adapted for use in the lubrication of any moving surface, the invention is peculiarly fitted for effective service in the lubrication of reciprocating piston rods. In Fig. 1 it is illustrated as applied to a piston rod 20 provided with a stuffing-box 21, in which are mounted a number of packing elements each comprising a housing element 22 and appropriate fluid-sealing packing such, for example, as a number of sectional metal packing rings 23.

In the form of packing selected for the purpose of illustration the housing rings 22 are of a diameter such as to be readily inserted within the bore 24 of the stuffing-box, and each housing ring is provided with a cylindrical recess 25 opening into one of its surfaces and of a depth corresponding with the thickness of a set of the packing rings 23. The packing rings 23 are held in snug contact with the surface of the piston rod by means of garter springs or other appropriate resilient elements 26, and the inner diameters of the housing rings 22 may be slightly greater than the diameter of the piston rod, thus providing a structure such as to enable the packing rings 23 to move laterally or float with respect to the housing rings 22 and compensate for slight lateral movements of portions of the piston rod, the surface of which need never be brought into contact with the inner surfaces of the housing rings.

The leakage of steam, gas or other fluid from the joint at the left end of the stuffing-box to the space surrounding the housing elements may be prevented by a gasket 27 of soft metal or other appropriate material, and the housing elements may be held in close contact with the gasket and with each other by a follower 28, which may be forced against and held in close contact with the housing element at the right end of the series by means of suitable fastening devices such, for example, as nuts 29 on tap-bolts 30 in threaded connection with the end of the stuffing-box.

If desired, the follower 28 may be provided with an auxiliary stuffing-box 31 within which may be mounted packing 32 adapted to prevent the escape of lubricant or of water of condensation or fluid which may make its way through the series of packing elements 23. The packing 32 may be held in the stuffing-box 31 by means of an auxiliary gland 33, which may be drawn up tightly against the packing by means of nuts 34 in threaded engagement with extensions 35 of the tap-bolts 30.

When used in association with packing of the above-described character, a lubricating device embodying applicant's invention may best be mounted in one of the housing elements 22' for the packing, which may differ from the housing element 22 in that it is sufficiently increased in thickness to provide requisite space for the lubricating mechanism.

In its preferred form the lubricating mechanism, as best illustrated in Fig. 4, may comprise a wiper 36 in the form of a plunger or piston mounted for endwise movement in a cylindrical recess 37 opening into the inner surface of the housing element 22'. As clearly indicated in Figs. 1 and 2 of the drawing this plunger is of relatively small diameter as compared with the diameter of the piston rod in order that it may not interfere with lateral movements of the rod in a direction at right angles with respect to the axis of the plunger.

As a means whereby a lubricant may be fed to the wiper 36 the housing element 22' may be provided with a conduit 38 communicating at one end with an opening 39 through a sleeve 40, one end of which extends into the mouth of a recess 41 in the surface of the plunger opposite that which makes contact with the rod. The sleeve 40 may be forced into an opening 42 in the housing which may be readily drilled through a threaded opening 43 provided for such purpose and subsequently closed by the insertion of a threaded cap 44.

The wiper 36 may be held in constant frictional contact with the surface of the piston rod by means of a helical spring 45, the ends of which may be confined between the plunger 36 and the screw-plug 44.

The above-described lubricating mechanism is but one of many forms which would be appropriate to serve the intended purpose. What is important is that the wiper be held in constant but yielding frictional contact with the surface of the rod and that means be provided to constantly feed lubricant to the wiper as it is applied by the wiper to the rod.

The housing 22' and the lubricating mechanism mounted therein may be installed in any desired part of the stuffing-box, and the lubricant may be fed from some convenient point without the stuffing-box to the lubricating device through a conduit which may comprise aligned openings 38' in the housing elements. In order that these openings may be maintained in perfect alignment, the housing element 22' and the various housing elements 22 may be provided with openings 46 to receive an aligning bar 47 adapted to prevent any relative angular movement between the respective housing elements.

The lubricant may be fed to the conduit leading to the lubricating device through an admission orifice 48 in the follower 28 having a branch connection 49 in alignment with the conduit 38' in the adjacent housing 22.

As a means of draining away the lubricating material which accumulates in the packing at a level below the piston rod, the housings may be provided with an internally-disposed channel 50 having a drainage outlet 51 connected therewith, and this channel may also be provided with a vent opening 52 (Fig. 3) at any suitable point above the level of the drainage outlet 51.

The admission orifice 48 may be threaded as at 53 for connection with a source of supply of lubricant, and, if desired, the drainage outlet 51 may also be threaded as at 54 so as to be connected with piping through which the drained lubricant may be led to any suitable point of discharge.

It will be obvious that, if desired, the drained lubricant may be strained or cleaned and carried back to the source of supply in any appropriate manner so as to be continuously circulated.

The above-described packing and lubricating device provides means whereby lubricant admitted at the orifice 48 may pass through the connection 49 and conduits 38' to and through the conduit 38 and through the sleeve 40 to the wiper 36. The oil applied to the rod by the wiper 36 gradually makes its way to the bottom of the stuffing-box, from which it is drained through the outlet 51.

The lubricating wiper 36 is an important element of the invention. As a result of efforts to lubricate a piston rod by means of a mere opening in a ring surrounding the rod but not in contact therewith, it has been found that the lubricating material follows the surface of the ring in opposite directions from its upper portion to portions of lower level where it collects at the bottom of the stuffing-box without ever having been brought into contact with the piston rod at all.

The lubricating device embodying the invention herein illustrated and described causes the lubricant to flow through the sleeve 40 into the cup-like recess in the wiper 36 and through the opening 55 in the wiper to the surface of the rod. The wiper and rod are held in constant mutual contact, irrespective of slight lateral movements of the rod with respect to the housing element 22', by means of the spring 45.

The escape of the lubricant from the right-hand end of the stuffing-box may be prevented by the oil-sealing rings 32, thus insuring its drainage from the system through the outlet 51.

The invention is not intended to be limited to the application in the preferred form herein illustrated and described, but is intended to include modifications and variations thereof within the scope of the appended claims.

What is claimed is:—

1. A rod lubricating device comprising a casing adapted for installation in a location adjacent but free from contact with a rod, a rod wiper comprising a perforated plunger of relatively small rod contacting area as compared with the diameter of the rod and extending over but a few degrees of its circumference so as to have a closely localized lubricant-applying portion, the plunger being slidably mounted in a complementary recess in the casing so that the rod may be free to move laterally in any direction with respect to the casing without restriction by the plunger, and means comprising a conduit in the casing in direct communication with the wiper for feeding lubricant to the wiper for localized application by the wiper to the surface of the rod.

2. A lubricating device, as defined by claim 1, of which the plunger has a cylindrical depression in the face opposite that intended to make contact with the rod, and of which the lubricant feeding means comprises a sleeve mounted in said casing with one end extended into the open end of the depression in the plunger, and the other end in communication with the conduit.

3. A lubricating device, as defined by claim 1, having, as a resilient means to hold the plunger in contact with the rod, a helical spring, mounted in the conduit with its ends confined between a fixed portion of the casing and the surface of the plunger opposite that which is intended to make contact with the rod.

4. A rod lubricating device adapted for use in a stuffing-box in association with a rod packing, said device comprising a mounting ring having an internal diameter slightly greater than the diameter of said rod, a rod wiper, having a lubricant applying portion localized to an area extending over but a few degrees of the circumference of the rod, mounted in the inner portion of said ring and movable in a radial direction only with respect to the part of the ring in which it is mounted, said ring, rod and wiper being relatively movable in such manner that the rod may be free to move laterally in any direction with respect to the ring without restriction by the wiper, resilient means to maintain the wiper in contact with the surface of the rod, and a conduit in said ring leading to said wiper through which lubricating material may be supplied to be locally applied by the wiper to the rod.

EDGAR NORWOOD FOX.